(12) United States Patent
Patience (10) Patent No.: US 9,463,754 B2
(45) Date of Patent: Oct. 11, 2016

(54) CAVITY ACOUSTIC TONES SUPPRESSION

(71) Applicant: BAE SYSTEMS PLC, London (GB)

(72) Inventor: David Euan Patience, Frimley (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 14/775,832

(22) PCT Filed: Mar. 13, 2014

(86) PCT No.: PCT/GB2014/050758
§ 371 (c)(1),
(2) Date: Sep. 14, 2015

(87) PCT Pub. No.: WO2014/140587
PCT Pub. Date: Sep. 18, 2014

(65) Prior Publication Data
US 2016/0031386 A1    Feb. 4, 2016

(30) Foreign Application Priority Data

Mar. 15, 2013 (EP) .................................. 13275064
Mar. 15, 2013 (GB) .................................. 1304716.2

(51) Int. Cl.
*B64C 23/06* (2006.01)
*B64D 1/06* (2006.01)
(Continued)

(52) U.S. Cl.
CPC ............ *B60R 13/08* (2013.01); *B64C 23/005* (2013.01); *G10K 11/16* (2013.01); *B64C 2230/08* (2013.01); *Y02T 50/166* (2013.01)

(58) Field of Classification Search
CPC . B64C 23/005; B64C 23/06; B64C 2230/08; B64D 7/08; B64D 1/06

USPC ................................ 181/286; 244/1 N, 137.1
See application file for complete search history.

(56) References Cited

U.S. PATENT DOCUMENTS 2,451,479 A    10/1948  Diehl
2,663,993 A    12/1953  Mosser
(Continued)

FOREIGN PATENT DOCUMENTS

DE    3534268 A1    4/1987
DE    3609541 A1    9/1987
(Continued)

OTHER PUBLICATIONS

EP Search Report dated Oct. 11, 2013 of Patent Application No. 13275064.7 filed Mar. 15, 2013.
(Continued)

*Primary Examiner* — Jeremy Luks
(74) *Attorney, Agent, or Firm* — Maine Cernota & Rardin (57) ABSTRACT

A cavity system that tends to increase the thickness (28) of the shear layer (22), comprising: a cavity (2) and a plurality of rods (4) extending away from the cavity base (3) to a height extending beyond the leading edge (14); the rods (4) being positioned downstream of and in the proximity of the leading edge (14). The rods (4) may extend to different heights and/or be positioned longitudinally offset (e.g. in a zig-zag pattern). The rods may be reversibly movable to a configuration in which they are fully enclosed in the cavity (2) when the cavity (2) is closed. Flow alteration elements (34, 38), for example channels (34) passing through the rods (4) and/or protrusions (38) extending from the rod (4) may be provided on the rods (4).

19 Claims, 6 Drawing Sheets

(51) Int. Cl.
   *B60R 13/08*     (2006.01)
   *B64C 23/00*     (2006.01)
   *G10K 11/16*     (2006.01)

(56) References Cited

U.S. PATENT DOCUMENTS

| | | |
|---|---|---|
| 2,749,064 A | 6/1956 | Kuhlman, Jr. |
| 5,340,054 A | 8/1994 | Smith |
| 5,699,981 A | 12/1997 | McGrath |
| 6,296,202 B1 | 10/2001 | Stanek |
| 6,739,554 B1 | 5/2004 | Stanek |
| 2002/0079405 A1 | 6/2002 | Layukallo |
| 2002/0190164 A1 | 12/2002 | Loth |
| 2008/0217485 A1 | 9/2008 | Ikeda |
| 2009/0045286 A1 | 2/2009 | King et al. |
| 2009/0045289 A1 | 2/2009 | Bilanin et al. |

FOREIGN PATENT DOCUMENTS

| | | |
|---|---|---|
| DE | 102005007940 A1 | 8/2006 |
| EP | 0673819 A1 | 9/1995 |
| GB | 614274 A | 12/1948 |
| JP | 2002205639 A | 7/2002 |

OTHER PUBLICATIONS

GB Search Report dated Jul. 24, 2013 of Patent Application No. 1304716.2 filed Mar. 15, 2013.
EP Search Report dated Nov. 13, 2013 of Patent Application No. 13275065.4 filed March 15, 2013.
GB Search Report dated Jul. 23, 2013 of Patent Application No. 1304718.8 filed Mar. 15, 2013.
EP Seach Report dated Jul. 16, 2013 of Patent Application No. 13275066.2 filed Mar. 15, 2013.
GB Search Report dated Jul. 24, 2013 of Patent Application No 1304722.0 filed Mar. 15, 2013.

CAVITY ACOUSTIC TONES SUPPRESSION

RELATED APPLICATIONS

This application is a national phase application filed under 35 USC §371 of PCT Application No. PCT/GB2014/050758 with an International filing date of 13 Mar. 2014 which claims priority of GB Patent Application 1304716.2 filed 15 Mar. 2013 and EP Patent Application 13275064.7 filed 15 Mar. 2013. Each of these applications is herein incorporated by reference in their entirety for all purposes.

FIELD OF THE INVENTION

The present invention relates to methods and systems for suppression of acoustic tones and/or resonance and/or other acoustic tone effects in cavities for when they are moving relative to an ambient fluid. The present invention relates in particular to, but is not limited to, such methods and systems for cavities recessed in a surface, for example in a surface of a vehicle, for example aircraft cavities, for example bays, when the aircraft is travelling through air.

BACKGROUND

Considering the case of a surface with a cavity recessed in the surface, when the surface, and hence the recessed cavity, is moving in ambient fluid, for example when an aircraft with an open bay, for example an open weapons bay or an open undercarriage bay, is moving in air, a shear layer is formed between (i) the moving ambient air that is flowing across the surface and across the top of the recessed cavity, and (ii) the static air in the cavity (from the reference point of the aircraft). A vortex is shed from the cavity leading edge and grows as it travels down the shear layer and impacts on the aft (trailing) wall of the bay resulting in the emission of noise. Also the acoustic wave travels back upstream inside the bay. The fluctuating pressure of the acoustic wave may either result in vortices being shed from the leading edge cavity lip or an increase in the growth rate of the vortices such that a series of vortices is formed down the shear layer at a preferential rate which is related to the frequency of the upstream acoustic wave. The vortices grow into large scale structures as they propagate downstream in the shear layer and then impact the aft (trailing) wall of the bay at a characteristic rate. This results in acoustic noise being generated at a characteristic rate which may be described as acoustic tones of a characteristic frequency.

The frequency of the tones may be formulated using Rossiter's equation. It can be seen that there is a feedback loop formed by the passage of the vortices and the upstream propagating acoustic wave.

U.S. Pat. No. 5,340,054 discloses an airframe cavity oscillations suppression arrangement in which plural pins are positioned upstream of the leading edge of the cavity (i.e. outside the cavity). Other examples of cavity resonance/oscillations suppression arrangements comprising added fixed structures (all of which are placed outside the cavity, either upstream of the leading edge or downstream of the aft (trailing) edge) include ones disclosed in U.S. Pat. No. 5,699,981; U.S. Pat. No. 6,098,925; U.S. Pat. No. 6,739,554; and U.S. Pat. No. 3,934,846. U.S. Pat. No. 6,296,202 discloses an arrangement comprising an oscillating spoiler plate.

More generally, air intakes or other tunnel like arrangements are known. Such arrangements, even if considered as including a cavity as such, do not include cavities that are of the type being addressed in the present invention, which on the contrary include cavities recessed in a surface.

SUMMARY OF THE INVENTION

The present inventor has realised that it would be desirable to provide a form of suppression by generating multiple fine scale turbulances i.e. resulting in multiple small vortices, within the shear layer, thereby disrupting the formation of large scale vortices in the shear layer which are part of the tone generation process, and moreover to provide that the multiple fine scale turbulances tend not to combine into larger ones. The present inventor has further realised that one way, for example, to deter the combination of the fine scale turbulence into larger ones would be to increase the thickness of the shear layer formed at the cavity (note for example, that in contrast the prior art arrangements disclosed in the above mentioned prior art documents do not have a tendency to thicken the shear layer). The present inventor has realised that, conventionally, an upstream acoustic wave interacts with the vortices in the shear layer at approximately common times i.e. they display a temporal coherence. The present inventor has realised that in contrast, by providing a thicker shear layer, the vortices closer to the stream flow will propagate downstream faster than those closer to the static air in the bay. The present inventor has realised that therefore at some point downstream the vortices will arrive at different times to each other. The present inventor has realised that this loss of temporal coherence will disrupt the formation of the conventional large scale turbulent structures that would otherwise play a key role in the generation of unwanted acoustic tones. The present inventor has further realised it is advantageous in itself to provide features of a suppression system inside the cavity rather than outside. For example, the inventor has realised that for closable cavities this would allow the features to be easily removed from the e.g. aircraft's airflow when the cavity is closed.

In a first aspect, the invention provides a cavity system, comprising: a cavity and a plurality of rods; the rods extending in a direction away from a base of the cavity to a height that extends beyond the height of a leading edge of the cavity, the leading edge being relative to an actual or intended flow direction of a fluid over the cavity; the rods being positioned downstream of, and in the proximity of, the leading edge of the cavity.

The cavity may be a cavity recessed in a surface. The surface may be a surface comprised by a vehicle. The vehicle may be an aircraft, or a missile, or any other type of vehicle, for example a car or a lorry, or a sea vessel, including for example a submarine.

One or more of the rods may extend to a different height to one or more of the other rods.

One or more of the rods may be positioned longitudinally offset with respect to one or more of the other rods.

The longitudinal offset may be in the form of a zig-zag pattern.

The rods may be fixed in the cavity in a manner that allows them to be reversibly moved to a further configuration in which they are fully enclosed in the cavity when the cavity is closed.

The rods may extend in the direction away from the base of the cavity from a position that is between the base of the cavity and the height of the leading edge of the cavity.

One or more flow alteration elements may be provided on one or more of the rods.

At least some of the flow alteration elements may comprise or provide additional edges at the one or more rods that are in addition to the edge or edges provided by the underlying shape of the rod or rods.

At least some of the flow alteration elements may comprise a channel passing through the rod.

At least some of the flow alteration elements may comprise a protrusion extending from the rod.

Flow alteration elements may be at different heights on different rods.

At least two different types of flow alteration elements may be provided.

The rods may be positioned at a distance from the leading edge that is ≤0.2×the distance between the leading edge and an aft edge.

The rods may be positioned at a distance from the leading edge that is ≤0.1×the distance between the leading edge and the aft edge.

The rods may be positioned at a distance from the leading edge that is ≤0.05×the distance between the leading edge and the aft edge.

For one or more of the rods, at least a portion of the rod may slant in the flow direction.

The effect of the rods may be to increase the thickness of the shear layer.

DETAILED DESCRIPTION

It will be appreciated that relative terms such as horizontal and vertical, top and bottom, above and below, front and back, and so on, are used above merely for ease of reference to the Figures, and these terms are not limiting as such, and any two differing directions or positions and so on may be implemented rather than truly horizontal and vertical, top and bottom, and so on. In particular, for convenience, in the Figures a cavity is shown with it opening at the top of the page, and so for convenience the word "top" is used to mean the opening of the cavity, and the word "above" means further away from the cavity, However, it will be appreciated that the present invention refer also to cavities positioned for example underneath the wing or fuselage of e.g. an aircraft, i.e. upside down to that shown in the Figures, but the description use of the word "top" will still refer to the opening part of the cavity and that of the word "above" will still refer to being away from the cavity.

Figure 1:
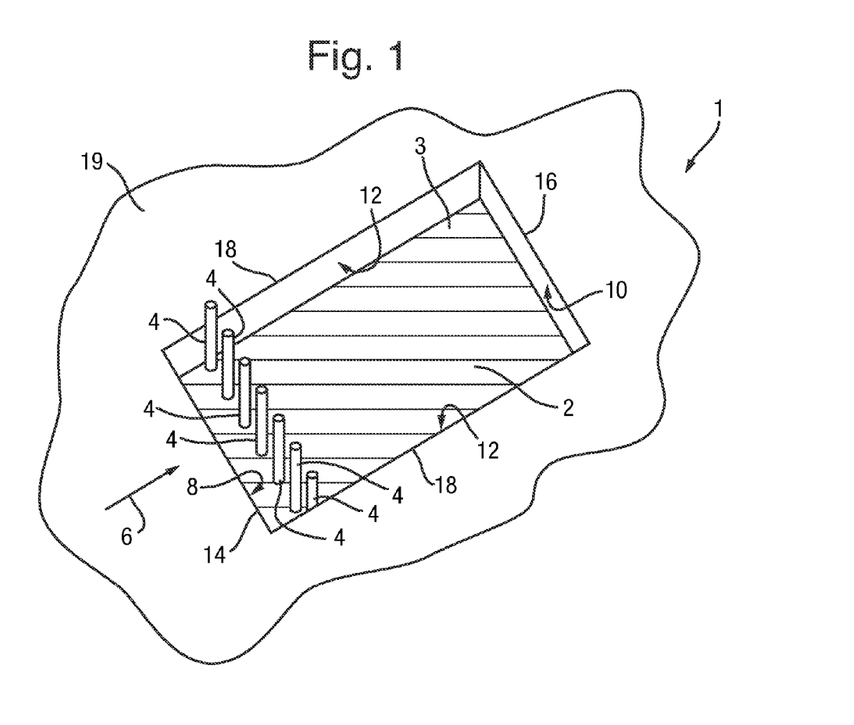
FIG. 1 is a schematic illustration (not to scale) of a perspective view of a cavity acoustic tones suppression system.

FIG. 1 is a schematic illustration (not to scale) of a perspective view of a first embodiment of a cavity acoustic tones suppression system 1 (hereinafter referred to as the suppression system 1). The cavity acoustic tone suppression system comprises a cavity 2 and a plurality of rods 4. In this embodiment the cavity 2 is in a surface 19. For clarity, only seven rods 4 are shown in FIG. 1, although typically the suppression system 1 will comprise more than seven rods, for example twenty rods.

Figure 2:
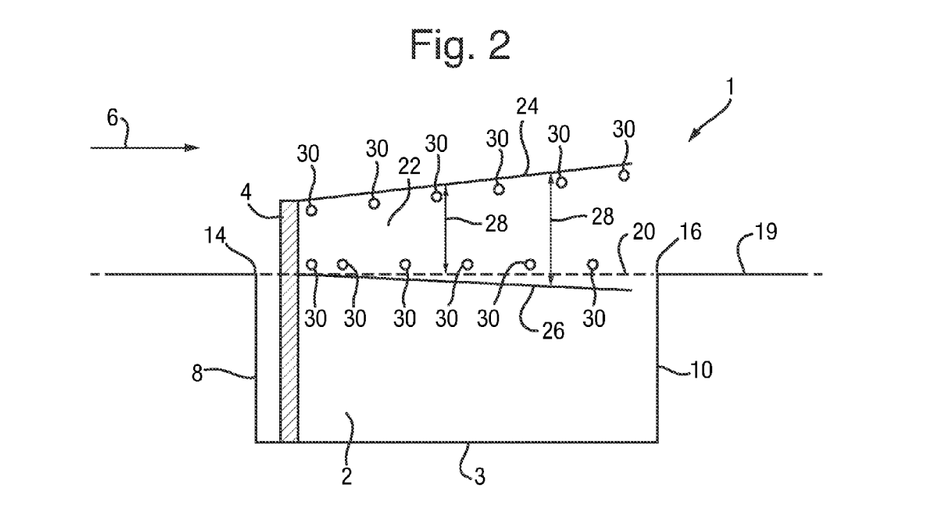
FIG. 2 is a schematic cross-sectional view of (not to scale) of the suppression system of FIG. 1.

In this embodiment the cavity 2 is a cavity 2 recessed in a surface 19 of an aircraft (in FIG. 2 the external boundary of the surface 19 is schematically identified by a zig-zag line to indicate in conventional drawing-style form that the extent of the surface 19 being schematically shown is not necessarily limited to the drawing page). The surface 19 is substantially planar, although not necessarily flat and not necessarily without non-uniformities or items fixed thereto. In this embodiment, the cavity 2 is rectangular and comprises a planar base 3. In FIG. 1 the planar base 3 is schematically shown in hatched shading. The cavity 2 further comprises, defined relative to an actual or intended flow direction 6 (the flow direction 6 being across, or over, the surface 19 and the cavity 2), a leading wall 8, an aft (trailing) wall 10, and two side walls 12. In this embodiment these walls are all perpendicular to the planar base 3. At the top of the cavity 2, the cavity 2 comprises, for each of these walls respectively, a leading edge 14, an aft (trailing) edge 16, and two side edges 18.

In this embodiment, the rods 4 are mounted on the planar base 3 and extend upwards (i.e. perpendicular to the planar base 3) away from the planar base 3 to a height that extends beyond the height of the leading edge 14.

In this embodiment the rods 4 are positioned downstream of the leading edge 14 (i.e. in the cavity 2), and the rods 4 are positioned closer to the leading edge 14 than they are to the aft (trailing) edge 16. More particularly, in this embodiment the rods 4 are positioned such that the distance of the rods 4 from the leading edge 14 equals 0.05×the total distance between the leading edge 14 and the aft (trailing) edge 14.

In this embodiment the rods 4 are all of circular cross-sectional shape when viewed from above.

In this embodiment the rods 4 are all of the same (circular) cross-sectional shape as each other when viewed from above, and are all of the same diameter as each other.

In this embodiment the rods each have a uniform cross-sectional shape along their entire height.

In this embodiment, the rods are all the same height as each other.

In this embodiment the rods 4 are all positioned spaced apart in a common straight line direction, the straight line direction being perpendicular to the flow direction 6, i.e. parallel to the leading edge 14. In this embodiment the rods 4 are all spaced equidistantly apart.

In this embodiment the rods 4 are positioned within the cavity 2 and displaced away from the leading wall 8 (closer to the leading wall 8 than the aft (trailing) wall 10). In other words there is a gap between the rods 4 and the leading wall 8, and hence a gap between the rods 4 and the leading edge 14.

The tendency of the suppression system 1 to suppress acoustic tones when in operation will now be described with reference to FIG. 2. FIG. 2 is a schematic cross-sectional view of (not to scale) of the suppression system 1 of FIG. 1. Elements of the system shown in FIG. 2 that were also shown in FIG. 1 are the following: the cavity 2, the planar base 3, one of the rods 4, the flow direction 6, the leading wall 8, the aft (trailing) wall 10, the leading edge 14, the aft (trailing) edge 16, and the surface 19 (which may also be considered as the plane of the surface).

As can be further appreciated from FIG. 2, a gap or major change in orientations in the surface 19 in effect provides the opening of the cavity 2, and the cavity 2 is in the form of a recess in the surface 19. It is noted that the terminology "cavity recessed in a surface" as used herein includes cases where the overall effect or geometry of the cavity is that it will be recognised as a "cavity recessed in a surface", even if strictly speaking the surface 19 and/or one or more of the walls 8, 10, 12 and/or the planar base 3 are not made from a single continuous piece or type of material.

Also shown (in dotted line form) for ease of explanation later below is a hypothetical extension 20 of the surface 19 over the cavity 2.

In operation, one effect of the plurality of rods 4 is to tend to increase the thickness of the shear layer 22 compared to if the rods 4 were not present. This is at least in part due to the rods presenting a blockage to the air flow to deflect the flow both in and out of the cavity. The shear layer 22 is represented schematically in FIG. 2 as the region between a line representing the top 24 (i.e. furthest away from the cavity 2) of the shear layer 22 and a line representing the bottom 26 (i.e. closest to the cavity 2) of the shear layer. The thickness 28 of the shear layer 22 at any point along the cavity 2 is correspondingly the distance between the top 24 of the shear layer 22 and the bottom 26 of the shear layer 22.

In operation, a further effect of the plurality of rods 4 is to tend to provide multiple sources of fine scale turbulence giving rise to a plurality of small vortices 30. Due at least in part to the thicker shear layer 22, the vortices 30 tend not to combine into larger ones. By provision of the thicker shear layer 22, the vortices 30 closer to the top 24 of the shear layer 22 (i.e. closer to the ambient fluid flow) propagate downstream faster than those vortices 30 closer to the bottom 26 of the shear layer 22 (i.e. closer to the static air in the cavity 2). Accordingly the vortices 30 arrive at given points downstream at different times i.e. there is a loss of temporal coherence, and consequently there is a disruption of the conventional tendency for formation of large scale turbulent structures that would otherwise play a key role in the generation of unwanted acoustic tones.

In the above embodiments, the rods 4 are mounted on the planar base 3 and extend upwards (i.e. perpendicular to the planar base 3) away from the planar base 3 to a height that extends beyond the height of the leading edge 14. However, the rods 4 need not be mounted on the planar base 3, and in other embodiments some or all of the rods 4 may be mounted on a fixture or otherwise supported or positioned other than mounted on the planar base 3, whilst nevertheless still extending in a direction away from the base 3 of the cavity 2. For example, some or all of the rods 4 may be mounted on, or otherwise supported by, a bar or other fixture that is suspended across the cavity 2, such that the bottoms of the rods 4 are positioned at points between the base 3 of the cavity 2 and the height of the leading edge 14. One embodiment in which the rods 4 are mounted on such a bar is described in further detail later below with reference to FIG. 14 and FIG. 15.

In further embodiments, flow alteration elements are provided on one or more (preferably all) of the rods 4. The flow alteration elements may increase the deflection of the vortices 30 into and/or out of the cavity 2, thereby further enhancing the thickening of the shear layer 22. The flow alteration elements may additionally or alternatively serve as additional sources of fine scale turbulence giving rise to yet further small vortices 30, hence tending to provide yet further loss of temporal coherence.

Figure 3:
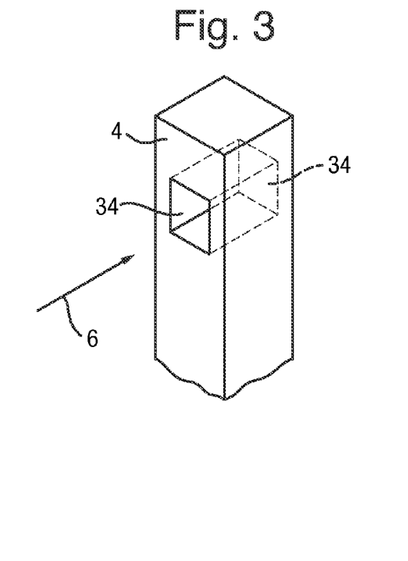
FIG. 3 is perspective view of a rod.
Figure 4:
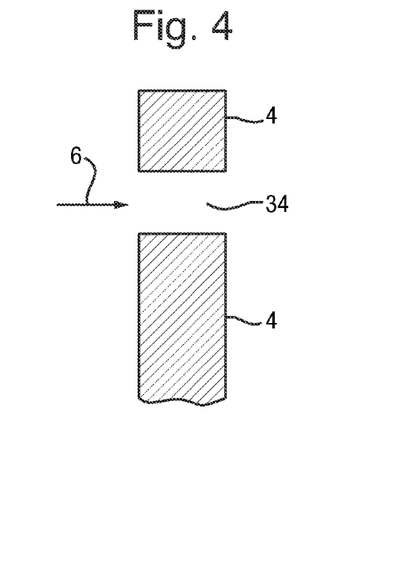
FIG. 4 is a cross-sectional view of the rod of FIG. 3.

FIGS. 3 and 4 are a schematic illustration (not to scale) of a rod 4 of one such embodiment with flow alteration elements provided on one or more (preferably all) of the rods 4. FIG. 3 is perspective view of the rod 4, and FIG. 4 is a cross-sectional view of the rod 4.

The rod 4 includes a channel 34 (i.e. in this embodiment the flow alteration element is the channel 34) passing through the rod 4 (either parallel to the flow direction 6 or at an oblique angle to the flow direction 6) and arranged such that in operation some of the fluid impacting the rod 4 passes through the channel 34 and some of the fluid is diverted around the rod 4, thereby providing additional sources of fine scale turbulence (hence additional vortices 30) and/or increasing the deflection of the vortices 30 into and/or out of the cavity 2, thereby further enhancing the thickening of the shear layer 22.

Figure 5:
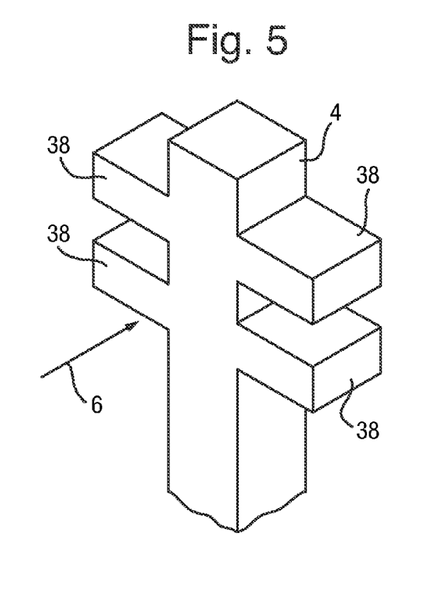
FIG. 5 is perspective view of a rod.
Figure 6:
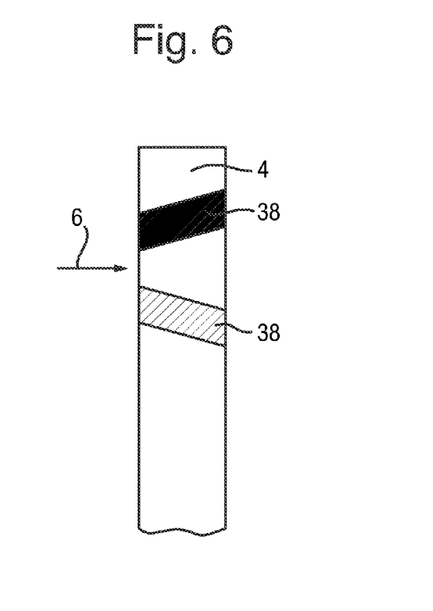
FIG. 6 is a cross-sectional view of the rod of FIG. 5.

FIGS. 5 and 6 are a schematic illustration (not to scale) of a rod 4 of a further such embodiment with flow alteration elements provided on one or more (preferably all) of the rods 4. FIG. 5 is perspective view of the rod 4, and FIG. 6 is a cross-sectional view of the rod 4.

The rod 4 includes a plurality of protrusions 38, serving as the flow alteration elements, extending from the surface of the rod 4. In this embodiment the protrusions 38 are fin-like protrusions 38. The protrusions are positioned and arranged (for example extending to the sides of the rod 4 to provide a wider cross-section to the ambient flow direction 6 at parts of the rod 4) such that in operation some of the fluid impacts the protrusions 38, thereby providing additional sources of fine scale turbulence (hence additional vortices 30) and/or increasing the deflection of the vortices 30 into and/or out of the cavity 2, thereby further enhancing the thickening of the shear layer 22.

In embodiments where flow alteration elements are provided on one or more of the rods 4, such as those embodiments described above with reference to FIGS. 3-6, the following variations (i) to (vii) are, for example, possible.

(i) For one or more of the rods provided with flow alteration elements, the rod may comprise one or plural flow alteration elements. For example, where each flow alteration element is a channel through a rod, two or more channels may be provided on a single rod (or on each of a plurality of rods), the channels being arranged above each other and/or beside each other, for example.

(ii) Where the flow alteration elements are protrusions, and there are plural protrusions on a given rod, the plural protrusion may be provided all on the same side of the rod, or on both sides of the rod.

(iii) The flow alteration elements may be arranged perpendicular and/or parallel to sides and/or surfaces of a given rod, or may be at an oblique angle thereto.

(iv) The flow alteration elements may be arranged perpendicular and/or parallel to the flow direction, or may be at an oblique angle e.g. skewed.

(v) For rods with plural flow alteration elements provided thereon, the plural flow alteration elements may all be channels, or may all be protrusions, or may be a mixture of each.

(vi) In the above embodiments with flow alteration elements on the rods, the flow alteration elements are channels through a rod and/or protrusions on the rod. However, in other embodiments any other forms of flow alteration elements may be provided additionally or alternatively. For example, one or more of the flow alteration elements may comprise a groove or other disturbance/irregularity in the surface or shape of the rod.

(vii) The flow alteration elements may be at different heights on different rods 4.

(viii) In the above embodiments a flow alteration element is a channel through a rod or a protrusion on a rod. Both of these types may be considered as elements that comprise or provide additional edges on or at the one or more rods that are in addition to the edge or edges provided by the underlying shape of the rod or rods. In other embodiments, in addition to or instead of the channels through a rod and/or protrusions on a rod, any other suitable type or types of flow alteration elements may be provided that comprise or provide additional edges on or at the one or more rods that are in addition to the edge or edges provided by the underlying shape of the rod or rods. In yet further embodiments, in addition to or instead of elements that comprise or provide additional edges on or at the one or more rods that are in addition to the edge or edges provided by the underlying shape of the rod or rods, any other suitable type or types of flow alteration elements may be provided that alter the flow so as to provide additional sources of fine scale turbulence (hence additional vortices 30) and/or increase the deflection of the vortices 30 into and/or out of the cavity 2, thereby further enhancing the thickening of the shear layer 22.

Returning to a more general discussion of further embodiments, in the above embodiments the rods 4 are all of circular cross-sectional shape when viewed from above. However, this need not be the case, and in other embodiments, the rods 4 may all be the same cross-sectional shape (when viewed from above) as each, where that shape is other than circular e.g. a non-circular curved shape, or a non-curved shape, e.g. rectangular.

In the above embodiments the rods 4 are all the same height as each other. However, this need not be the case, and in other embodiments one or more of the rods may be a different height to one or more of the other rods. Indeed, this will tend to encourage shedding of the vortices 30 to occur at different depths in the shear layer 2 (by providing sources of fine scale turbulence at differing heights), hence tending to further increase the extent of the disruption of temporal coherence between the different vortices 30.

Figure 7:
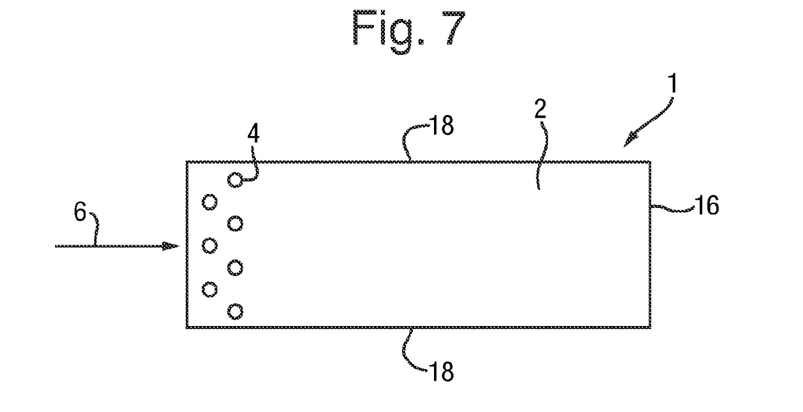
FIG. 7 shows a suppression system, viewed from above, in which rods are positioned relative to each other in a zig-zag layout.
Figure 8:
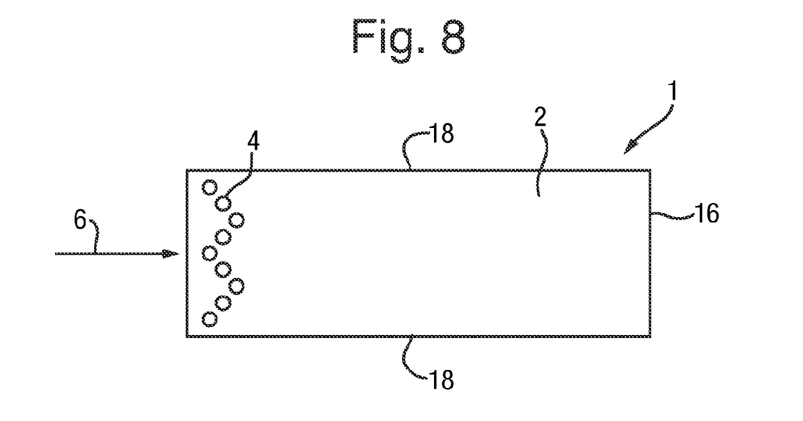
FIG. 8 shows a suppression system, viewed from above, in which rods are positioned relative to each other in a zig-zag layout.
Figure 9:
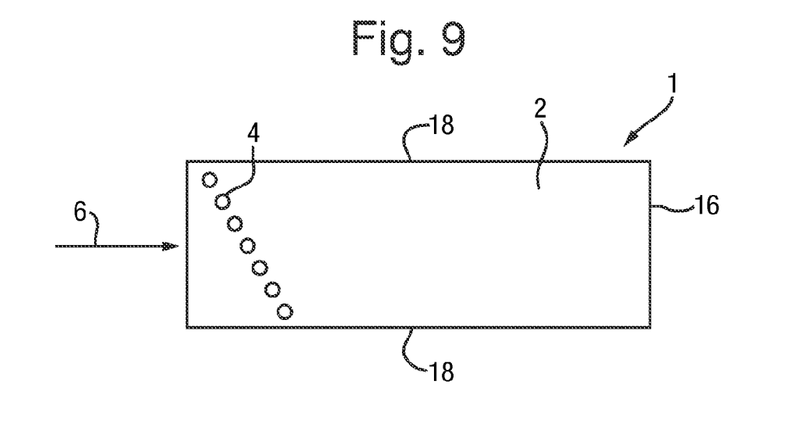
FIG. 9 shows a suppression system, viewed from above, in which rods are positioned along a line at an oblique angle to the flow direction.

In the above embodiments the rods 4 are all positioned spaced apart in a common straight line direction, the straight line direction being perpendicular to the flow direction 6, i.e. parallel to the leading edge 14. However, this need not be the case, and in other embodiments one or more of the rods 4 may be positioned other than in a straight line with the other rods 4, i.e. one or more of the rods may be positioned longitudinally offset with respect to one or more of the other rods. For example, the different rods 4 may be positioned relative to each other in a zig-zag layout, such as the rod position layouts shown schematically in FIG. 7 and FIG. 8 (in which the suppression system 1 (not to scale) is viewed from above and in which the same reference numerals are used for the same features as were used in the earlier Figures). In yet further embodiments, even though the rods 4 remain in a common straight line direction, that direction is at an oblique angle to the flow direction, as for example shown schematically (not to scale) in FIG. 9 (in which the suppression system 1 (not to scale) is again viewed from above and in which the same reference numerals are again used for the same features as were used in the earlier Figures). In the further embodiments described in this paragraph, the longitudinal offset arrangements of some or all of the different rods 4 relative to each other (as described in this paragraph) tend to provide a temporal time shift in the passage of any peak of the acoustic wave, tending to result in the shedding or the growth of the vortices 30 to occur at different times across the width (i.e. across the later plane) of the cavity 2, which tends to further disrupt the combination of the plural small vortices 30 into larger scale vortices.

In general it will be appreciated that any non-uniformity introduced into the form of one or more of the individual rods 4 (for example by, but not limited to, inclusion of one or more flow alteration elements as described earlier above) and/or any non-uniformity introduced between one or more of the different rods 4 will tend to provide the possibility of increased numbers or variations of sources of fine scale turbulence, with corresponding increased numbers of small vortices and/or thicker shear layer and/or increased disruption of the temporal coherence of the small vortices, any of which effects may further improve the suppression performance of the suppression system 1. The following further embodiments (i) to (v) are further examples of embodiments introducing or enhancing such non-uniformity.

(i) In the above embodiments the rods 4 are all of the same (circular) cross-sectional shape as each other when viewed from above, and are all of the same diameter as each other. However, this need not be the case, and in other embodiments one or more of the rods 4 may have a different cross-sectional shape when viewed from above and/or may have a different diameter or other relevant dimension to the other rods 4.

(ii) In the above embodiments the rods 4 each have a uniform cross-sectional shape along their entire height. However, this need not be the case, and in other embodiments one or more of the rods 4 may have a non-uniform cross-sectional shape along its entire height.

Figure 10:
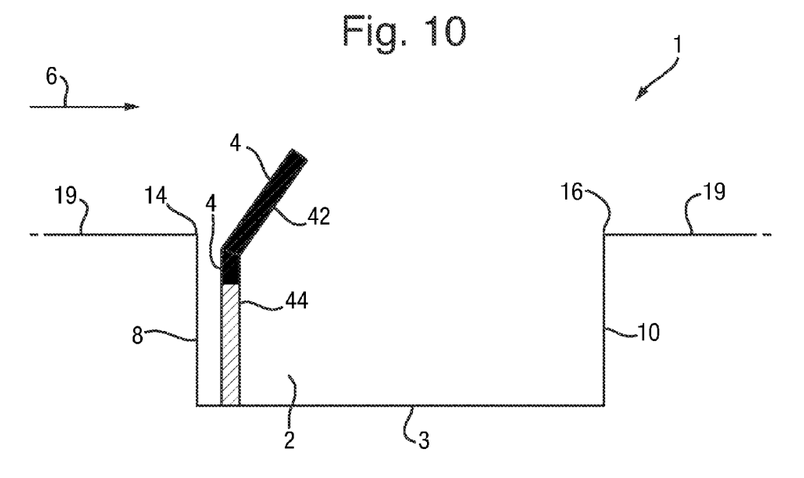
FIG. 10 shows a suppression system in which one or more rods are other than straight.

(iii) In the above embodiments the rods 4 are each straight (albeit one or more may have a varying thickness), in the sense of extending from the base of the cavity in a substantially straight direction i.e. without bends or kinks. However, this need not be the case, and in other embodiments one or more of the rods 4 may be other than straight i.e. may be shaped such that it/they extend/extends from the base of the cavity in a direction that includes one or more bends or kinks. One example of such an embodiment is shown in FIG. 10 (which is a schematic cross-sectional view (not to scale) of the suppression system 1 and in which the same reference numerals are used for the same features as were used in the earlier Figures). In this embodiment, an upper portion 42 of one or more of the rods 4 extends at an oblique angle to a lower portion 44 of the rod 4. In the embodiment shown in FIG. 10 the upper portion 42 is parallel to the flow direction 6, however in other embodiments the upper portion 42 (or other angled portion in other examples) may extend directly or obliquely across the flow direction 6. The point at which the rod is angled may be below, level with, or above the height of the leading edge 14.

(iv) In the above embodiments the rods 4 are all spaced equidistantly apart. However, this need not be the case, and in other embodiments one or more of the spacing distances between adjacent rods 4 may be unequal to the spacing distance between two other adjacent rods 4.

(v) In the above embodiments the rods 4 are positioned within the cavity 2 and displaced away from the leading wall 8 (closer to the leading wall 8 than the aft (trailing) wall 10). In other words there is a gap between the rods 4 and the leading wall 8, and hence a gap between the rods 4 and the leading edge 14. However, this need not be the case, and in other embodiments one or more of the rods 4 may be butted up against, or integrated with, the leading wall 8, such that there is no gap between the one or more rods 4 and the leading wall 8/leading edge 14. For the case of embodiments where the leading wall 8 is not parallel with the extension direction of the rods 4, in some of those embodiments, there may be a gap between one or more of the rods 4 and the leading edge 14 but not between the one or more rods 4 and the leading wall 8. Or, vice-versa, there may be a gap between one or more of the rods 4 and the leading wall 8 but not one between the one or more rods 4 and the leading edge 14.

Returning to a more general discussion of further embodiments, in the above embodiments the rods 4 are positioned downstream of the leading edge 14 (i.e. in the cavity 2), and the rods 4 are positioned closer to the leading edge 14 than they are to the aft (trailing) edge 16. More particularly, in the above embodiments the rods 4 are positioned such that the distance of the rods 4 from the leading edge 14 equals 0.05×the total distance between the leading edge 14 and the aft (trailing) edge 14. However this need not be the case, and in other embodiments the rods 4 may be positioned at any position downstream of the leading edge that is in the proximity of the leading edge. This may include, for example, any position downstream of the leading edge that is closer to the leading edge 14 than it is to the aft (trailing) edge 16, as some degree of suppression will still tend to occur. However, preferably the rods 4 are positioned closer to the leading edge than that, as then an even greater extent of the suppression effect will tend to occur. For example, as well as the preferred positioning at a distance downstream from the leading edge of 0.05×the total distance between the leading edge 14 and the aft (trailing) edge 16, even more preferred is any positioning at a distance of ≤0.05×the total distance, but also preferred more generally is positioning at a distance of ≤0.1×the total distance, and yet more generally any positioning at a distance of ≤0.2×the total distance.

In the above embodiments, the cavity 2 is rectangular and comprises a planar base 3, the cavity 2 further comprises, defined relative to an actual or intended flow direction 6, a leading wall 8, an aft (trailing) wall 10, and two side walls 12, and these walls are all perpendicular to the planar base 3. However, these specific cavity details are not essential, and in other embodiments any other cavity shape may be present. For example, there need not be only four walls, the walls need not be straight or perpendicular, the cavity may be defined by one or more walls forming a curved or partially curved perimeter to the cavity, the perimeter may be irregularly shaped, one or more walls may be sloping, the base and or one or more walls may be undulating or sloped, and so on. However, the suppression will tend to occur more strongly the more straightforwardly the leading edge (compared to the actual or intended airflow direction) is defined or present.

Also, it will be appreciated that in embodiments with cavity shapes as described above, including irregularly shaped cavities, the skilled person will modify such directions described above as parallel, transverse, perpendicular, and the like, which are suitable for regularly shaped cavities, to provide other directions that achieve corresponding functionalities, at least to some extent, as those described above as parallel, transverse, perpendicular, and the like. Also, even when the cavity is regularly shaped, in yet further embodiments, directions that contain a resolved part of the described parallel, transverse, perpendicular, and the like direction may be implemented instead of completely parallel, transverse, perpendicular, and the like directions.

Figure 11:
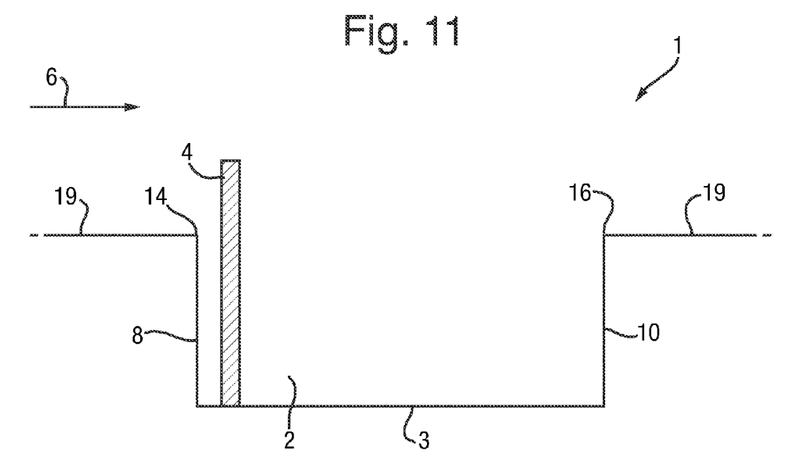
FIG. 11 shows a schematic cross-sectional view of a first configuration of a suppression system.
Figure 12:
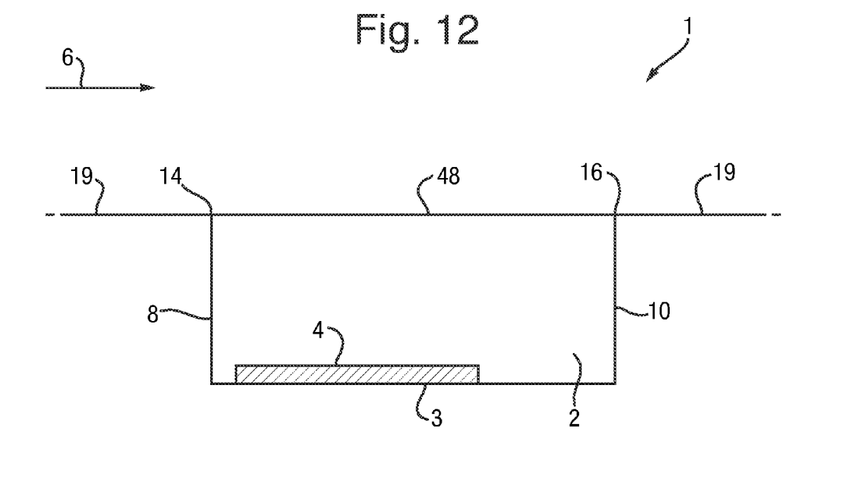
FIG. 12 shows a schematic cross-sectional view of a second configuration of the suppression system of FIG. 11.

As mentioned earlier above, the present inventor has realised it is advantageous in itself to provide features of a suppression system inside the cavity rather than outside, since, for example, as the inventor has realised, in the case of a closable cavity this will allow the features to be easily removed from the e.g. aircraft's airflow when the cavity is closed. Hence, in further embodiments, the rods are fixed in the cavity in a manner that allows them to be reversibly moved to a further configuration in which they are fully enclosed in the cavity when the cavity is closed. This tends to be particularly advantageous in applications where the cavity will be closed for relatively long periods, and/or frequently, for example in the undercarriage bay of an aircraft. FIG. 11 and FIG. 12 show schematic cross-sectional views (not to scale) of one example of such an embodiment of a suppression system 1. In FIGS. 11 and 12 the same reference numerals are used for the same features as were used in the earlier Figures. FIG. 11 shows a first configuration of the suppression system 1, in which the cavity 2 is open, and so the rods 4 are arranged such that they extend out of the cavity 2, as in the embodiments described earlier above. FIG. 12 shows a second configuration of the suppression system 1, in which the cavity 2 is closed, by virtue of a cover 48 covering the opening of the cavity 2. In the second configuration, the rods 4 are arranged such that they no longer extend out of the cavity 2, and instead are fully enclosed within the closed cavity 2. In this embodiment the rods are arranged in this configuration by virtue of being folded over compared to their first configuration position. However, it will be appreciated that any suitable repositioning or reconfiguring process may be used to provide that the rods are re-arranged to be enclosed within the closed cavity.

Figure 13:
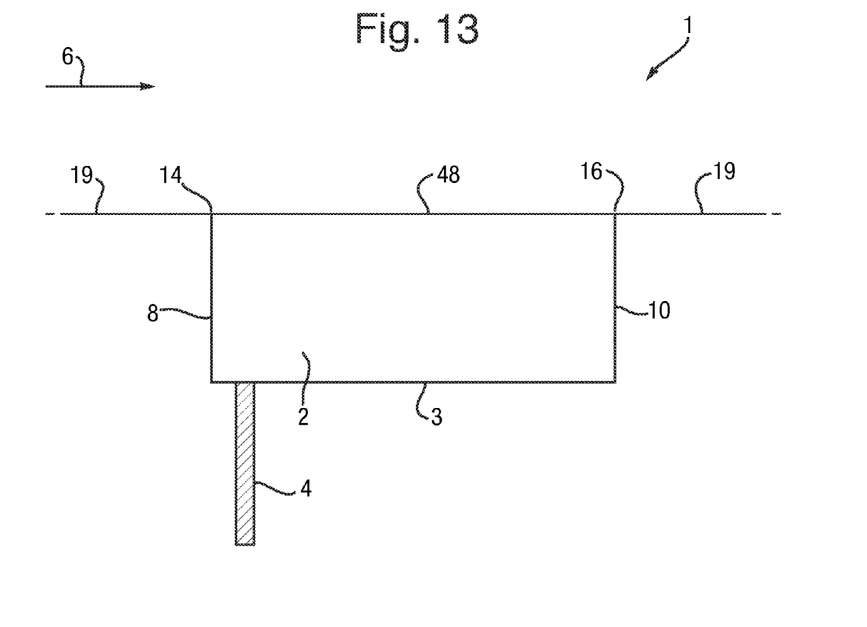
FIG. 13 shows a schematic cross-sectional view of an alternative second configuration of the suppression system of FIG. 11.

Another possible embodiment for the second configuration is shown in FIG. 13, which is again a schematic cross-sectional view (not to scale) of the suppression system 1. In this embodiment, in the second configuration the rods 4 are retracted through the base 3 of the cavity 2 into the body in which the cavity 2 exists. This potentially advantageous configuration is derived from the fact that the rods extend away from the base of the cavity and hence are easily retractable.

Figure 14:
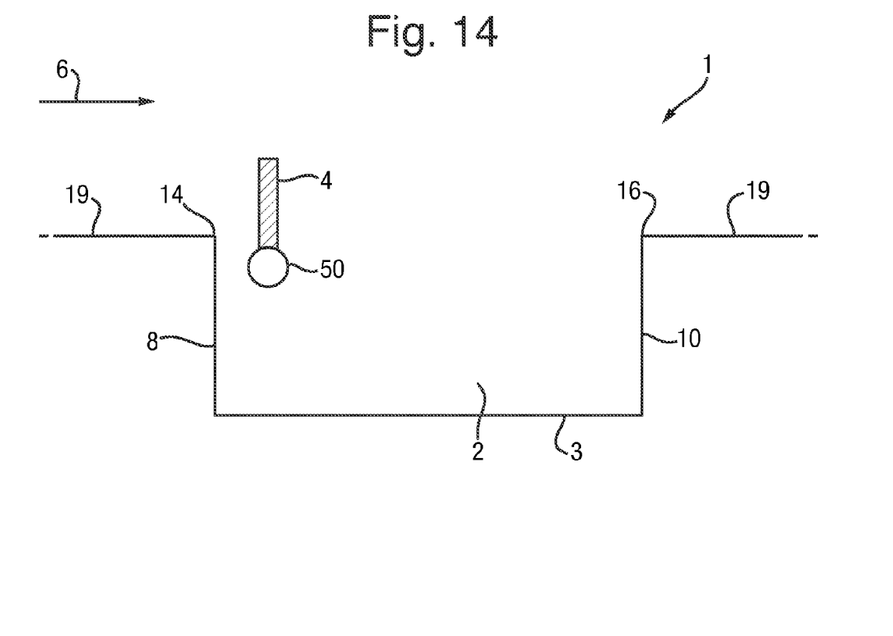
FIG. 14 shows a schematic cross-sectional view of another first configuration of a suppression system.
Figure 15:
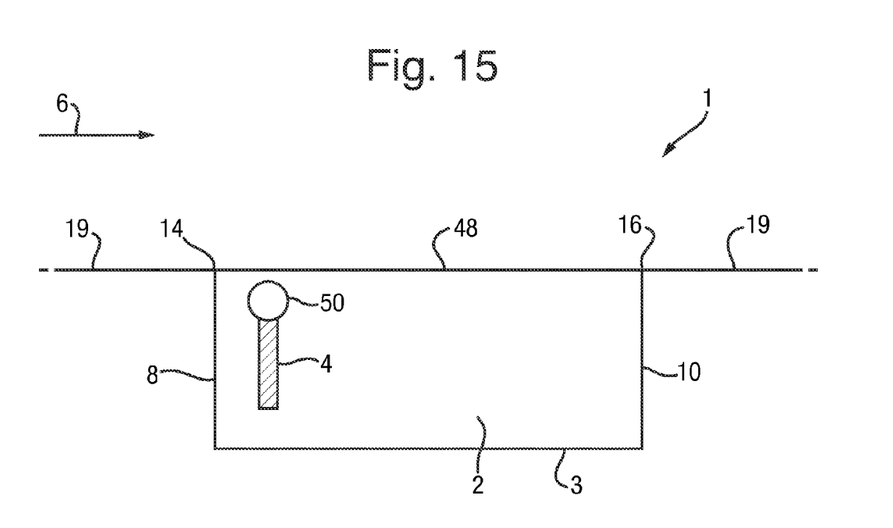
FIG. 15 shows a schematic cross-sectional view of a second configuration of the suppression system of FIG. 14.

FIG. 14 and FIG. 15 show schematic cross-sectional views (not to scale) of a further embodiment of a suppression system 1 with a first and second configuration. In FIGS. 14 and 15 the same reference numerals are used for the same features as were used in the earlier Figures. In this embodiment, the rods 4 are mounted on a rotatable bar 50 that is suspended across the cavity 2 at a height position between the base 3 of the cavity 2 and the height of the leading edge 14, so that likewise the bottoms of the rods 4 are positioned at points between the base 3 of the cavity 2 and the height of the leading edge 14. FIG. 14 shows a first configuration of the suppression system 1, in which the cavity 2 is open, and so the bar 50 is in a first rotation position that arranges the rods 4 to extend out of the cavity 2 in a direction away from the base of the cavity. FIG. 15 shows a second configuration of the suppression system 1, in which the cavity 2 is closed, by virtue of a cover 48 covering the opening of the cavity 2. In the second configuration, the bar is rotated to a second rotation position in which the rods 4 are arranged such that they no longer extend out of the cavity 2, and instead are located fully inside the closed cavity 2. In this embodiment the second rotation position is such that the rods extend downwards in a direction toward the base of the cavity in the second configuration. In other versions, the rods may again be located fully inside the cavity in the second configuration, but may however extend in another direction, e.g. along the cavity.

In yet further embodiments, reconfigurable arrangements are provided in which the rods 4 may be moved between configurations inside and outside of the cavity 2, for example as described with reference to FIGS. 11 to 15, but where in the second configuration the cavity is not closed, or is only partially closed.

The above described surface in which the cavity is recessed may be a surface of a vehicle. The vehicle may be an aircraft, or a missile, or any other type of vehicle, for example a car or a lorry, or a sea vessel, including for example a submarine.

What is claimed is:

1. A cavity system, comprising:
   a cavity (2) and a plurality of rods (4);
   the rods (4) extending in a direction away from a base (3) of the cavity (2) to a height that extends beyond the height of a leading edge (14) of the cavity (2), the leading edge (14) being relative to an actual or intended flow direction (6) of a fluid over the cavity (2);
   the rods (4) being positioned downstream of, and in the proximity of, the leading edge (14) of the cavity (2);
   wherein one or more flow alteration elements (34, 38) are provided on one or more of the rods (4);
   wherein at least some of the flow alteration elements (34, 38) comprise or provide additional edges at the one or more rods (4) that are in addition to the edge or edges provided by the underlying shape of the rod or rods (4); and
   wherein at least some of the flow alteration elements (34, 38) comprise a channel (34) passing through the rod (4).

2. The cavity system according to claim 1, wherein one or more of the rods (4) extends to a different height to one or more of the other rods (4).

3. The cavity system according to claim 1, wherein one or more of the rods (4) is positioned longitudinally offset with respect to one or more of the other rods (4).

4. The cavity system according to claim 3, wherein the longitudinal offset is in the form of a zig-zag pattern.

5. The cavity system according to claim 1, wherein the rods (4) are fixed in the cavity (2) in a manner that allows them to be reversibly moved to a further configuration in which they are fully enclosed in the cavity (2) when the cavity (2) is closed.

6. The cavity system according to claim 1, wherein at least some of the flow alteration elements (34, 38) comprise a protrusion (38) extending from the rod (4).

7. The cavity system according to claim 1, wherein at least two different types of flow alteration elements (34, 38) are provided.

8. The cavity system according to claim 1, wherein the rods (4) are positioned at a distance from the leading edge (14) that is ≤0.2×the distance between the leading edge (14) and an aft edge (16).

9. The cavity system according to claim 8, wherein the rods (4) are positioned at a distance from the leading edge (14) that is ≤0.1×the distance between the leading edge (14) and the aft edge (16).

10. The cavity system according to claim 9, wherein the rods (4) are positioned at a distance from the leading edge (14) that is ≤0.05×the distance between the leading edge (14) and the aft edge (16).

11. The cavity system according to claim 1, wherein for one or more of the rods (4), at least a portion of the rod (4) slants in the flow direction (6).

12. The cavity system according to claim 1, wherein the effect of the rods (4) is to increase the thickness (28) of the shear layer (22).

13. A cavity system, comprising:
    a cavity (2) and a plurality of rods (4);
    the rods (4) extending in a direction away from a base (3) of the cavity (2) to a height that extends beyond the height of a leading edge (14) of the cavity (2), the leading edge (14) being relative to an actual or intended flow direction (6) of a fluid over the cavity (2);
    the rods (4) being positioned downstream of, and in the proximity of, the leading edge (14) of the cavity (2);
    wherein one or more flow alteration elements (34, 38) are provided on one or more of the rods (4);
    wherein at least some of the flow alteration elements (34, 38) comprise or provide additional edges at the one or more rods (4) that are in addition to the edge or edges provided by the underlying shape of the rod or rods (4); and
    wherein the flow alteration elements (34, 38) are at different heights on different rods (4).

14. The cavity system according to claim 13, wherein at least two different types of flow alteration elements (34, 38) are provided.

15. The cavity system according to claim 13, wherein the rods (4) are positioned at a distance from the leading edge (14) that is ≤0.2×the distance between the leading edge (14) and an aft edge (16).

16. The cavity system according to claim 15, wherein the rods (4) are positioned at a distance from the leading edge (14) that is ≤0.1×the distance between the leading edge (14) and the aft edge (16).

17. The cavity system according to claim 16, wherein the rods (4) are positioned at a distance from the leading edge (14) that is ≤0.05×the distance between the leading edge (14) and the aft edge (16).

18. The cavity system according to claim 13, wherein for one or more of the rods (4), at least a portion of the rod (4) slants in the flow direction (6).

19. A cavity system, comprising:
    a cavity (2) and a plurality of rods (4);
    the rods (4) extending in a direction away from a base (3) of the cavity (2) to a height that extends beyond the height of a leading edge (14) of the cavity (2), the leading edge (14) being relative to an actual or intended flow direction (6) of a fluid over the cavity (2);
    the rods (4) being positioned downstream of, and in the proximity of, the leading edge (14) of the cavity (2);
    wherein one or more flow alteration elements (34, 38) are provided on one or more of the rods (4);
    wherein at least some of the flow alteration elements (34, 38) comprise or provide additional edges at the one or more rods (4) that are in addition to the edge or edges provided by the underlying shape of the rod or rods (4);
    wherein at least some of the flow alteration elements (34, 38) comprise a channel (34) passing through the rod (4); and wherein the flow alteration elements (34, 38) are at different heights on different rods (4).

\* \* \* \* \*